(12) United States Patent
George et al.

(10) Patent No.: US 12,554,056 B2
(45) Date of Patent: Feb. 17, 2026

(54) WIRE GRID POLARIZER HAVING WIRES WITH SILICON CORE AND SILICON DIOXIDE RIBS

(71) Applicant: Moxtek, Inc., Orem, UT (US)

(72) Inventors: Matthew C. George, Lindon, UT (US); Daniel Bacon-Brown, Sandy, UT (US); R. Stewart Nielson, Pleasant Grove, UT (US); Shaun Patrick Ogden, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 917 days.

(21) Appl. No.: 17/842,026

(22) Filed: Jun. 16, 2022

(65) Prior Publication Data

US 2023/0021232 A1    Jan. 19, 2023

Related U.S. Application Data

(60) Provisional application No. 63/222,592, filed on Jul. 16, 2021.

(51) Int. Cl.
G02B 5/30        (2006.01)
G02F 1/1335      (2006.01)

(52) U.S. Cl.
CPC ..... *G02B 5/3058* (2013.01); *G02F 1/133548* (2021.01)

(58) Field of Classification Search
CPC .......... G02B 5/3058; G02F 1/133548
See application file for complete search history.

(56) References Cited

U.S. PATENT DOCUMENTS

| | | | |
|---|---|---|---|
| 8,755,113 B2 | 6/2014 | Gardner et al. | |
| 10,054,717 B2 | 8/2018 | Wangensteen et al. | |
| 10,534,120 B2 | 1/2020 | Nielson et al. | |
| 2016/0291227 A1* | 10/2016 | Nielson | G02B 1/04 |
| 2021/0063623 A1 | 3/2021 | Diwan et al. | |

FOREIGN PATENT DOCUMENTS

| | | |
|---|---|---|
| JP | 66321295 B2 | 1/2020 |
| WO | WO2018093284 | 5/2018 |

* cited by examiner

*Primary Examiner* — Ryan S Dunning
(74) *Attorney, Agent, or Firm* — Thorpe North & Western, LLP

(57) ABSTRACT

The wire grid polarizers 10 and 30 described herein, and wire grid polarizers made by methods described herein, can have high performance across a broad range of the ultraviolet spectrum and across a broad angle of incidence. These polarizers can be durable (resistant to heat, moisture, ultraviolet light, and oxidation). The polarizer can include an array of wires 15 on a substrate 11. Each wire 15 can have a silicon core 12 and a pair of silicon dioxide ribs 13. The core 12 can be sandwiched between the pair of ribs 13, with each rib 13 adjacent to a sidewall 12s of the core 12. A rib width W13 can be ≥4 nm. Each wire 15 can also include a silicon dioxide cap 14. The core 12 can be encircled by a silicon dioxide ring 17.

20 Claims, 4 Drawing Sheets

WIRE GRID POLARIZER HAVING WIRES WITH SILICON CORE AND SILICON DIOXIDE RIBS

CLAIM OF PRIORITY

This application claims priority to U.S. Provisional Patent Application No. US63/222,592, filed on Jul. 16, 2021, which is incorporated herein by reference.

FIELD OF THE INVENTION

The present application is related to wire grid polarizers.

BACKGROUND

A wire grid polarizer (WGP) can divide light into two different polarization states. One polarization state can primarily pass through the WGP and the other polarization state can be primarily absorbed or reflected. The effectiveness or performance of WGPs is based on high transmission of a predominantly-transmitted polarization (sometimes called Tp) and minimal transmission of an opposite polarization (sometimes called Ts).

It can be beneficial to have high contrast (Tp/Ts). Contrast can be improved by increasing transmission of the predominantly-transmitted polarization (e.g. increasing Tp) and by decreasing transmission of the opposite polarization (e.g. decreasing Ts).

BRIEF DESCRIPTION OF THE DRAWINGS (DRAWINGS MIGHT NOT BE DRAWN TO SCALE)

Figure 1:
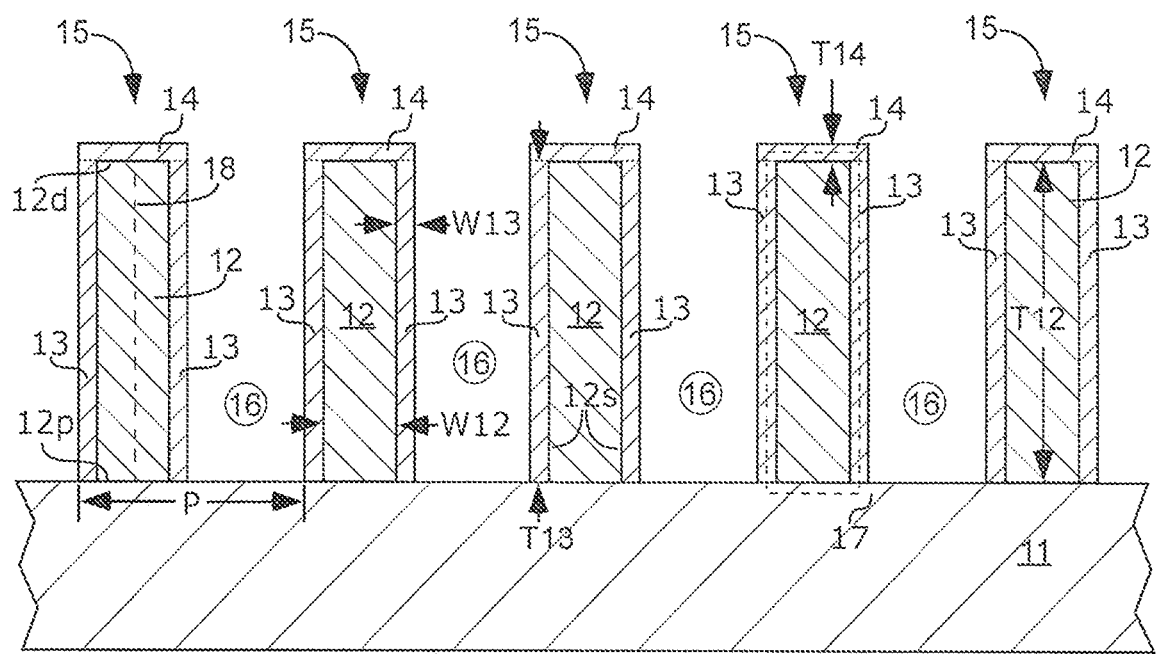

FIG. 1 is a cross-sectional side-view of a wire grid polarizer 10 with an array of wires 15 on a substrate 11. Each wire 15 can have a core 12 sandwiched between a pair of ribs 13, and a cap 14 at a distal end 12d of the core 12. The core 12 can be made of silicon. The substrate 11, the pair of ribs 13, and the cap 14 can be made of silicon dioxide, forming a ring 17 of silicon dioxide around the core 12.

Figure 2:
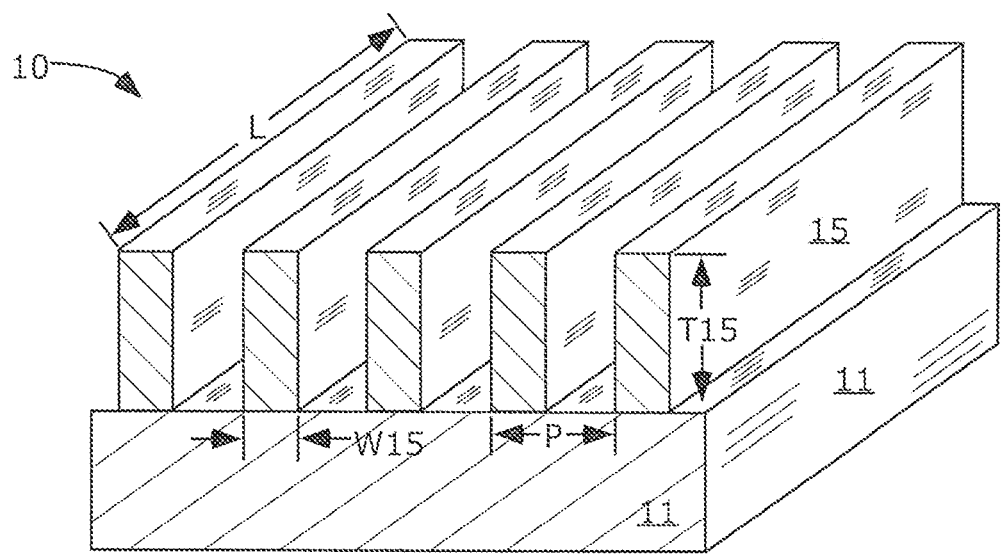

FIG. 2 is a perspective-view of the wire grid polarizer 10 of FIG. 1.

Figure 3:
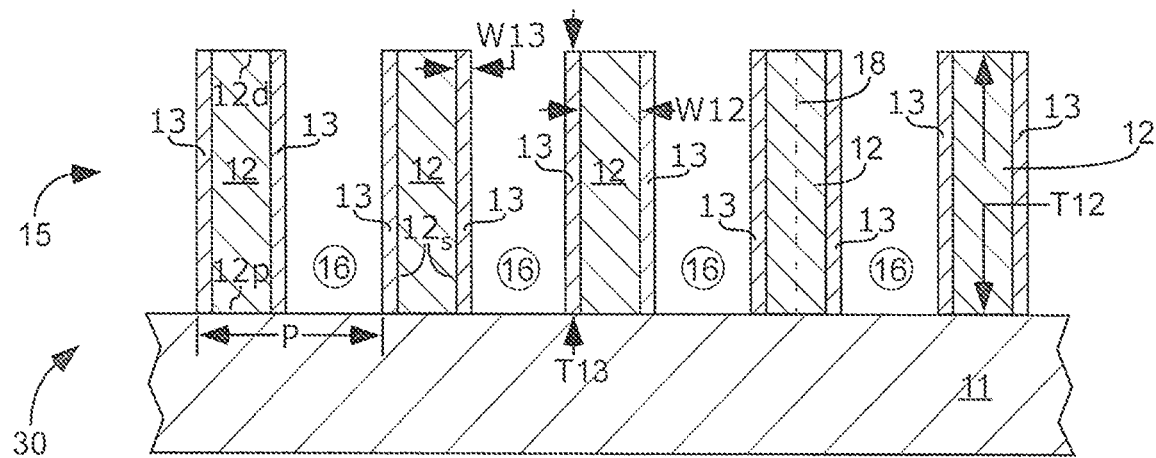

FIG. 3 is a cross-sectional side-view of a wire grid polarizer 30 with an array of wires 15 on a substrate 11. Each wire 15 can have a core 12 sandwiched between a pair of ribs 13. The core 12 can be made of silicon. The pair of ribs 13 can be made of silicon dioxide. A distal end 12d of the core 12 can be free of the ribs 13.

Figure 4:
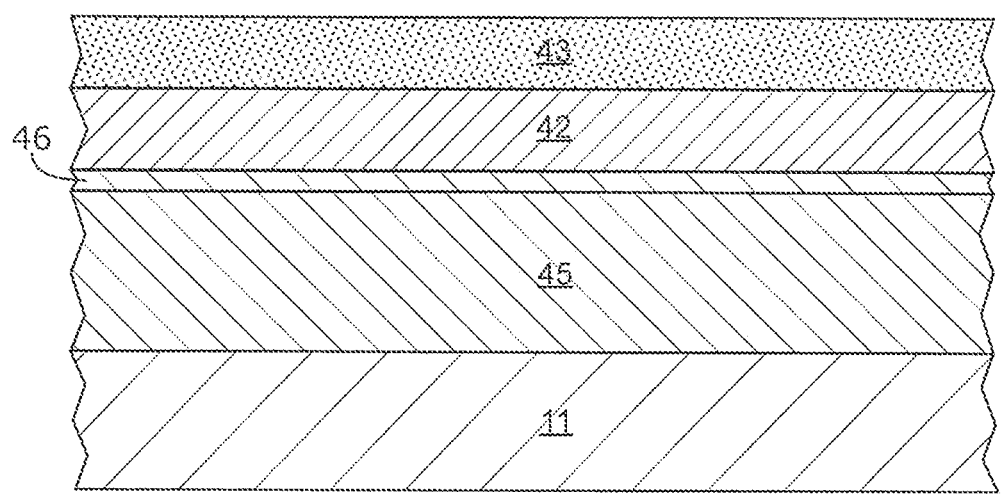

FIG. 4 is a cross-sectional side-view illustrating steps in a method of making a wire grid polarizer, including (a) applying a layer of silicon 45 on a substrate 11; (b) applying a low-index layer 46 on the layer of silicon 45; (c) applying a layer of silicon dioxide 42 on the layer of silicon 45, or on the low-index layer 46 if used; and (c) applying an uncured layer 43 on the layer of silicon dioxide 42.

Figure 5:
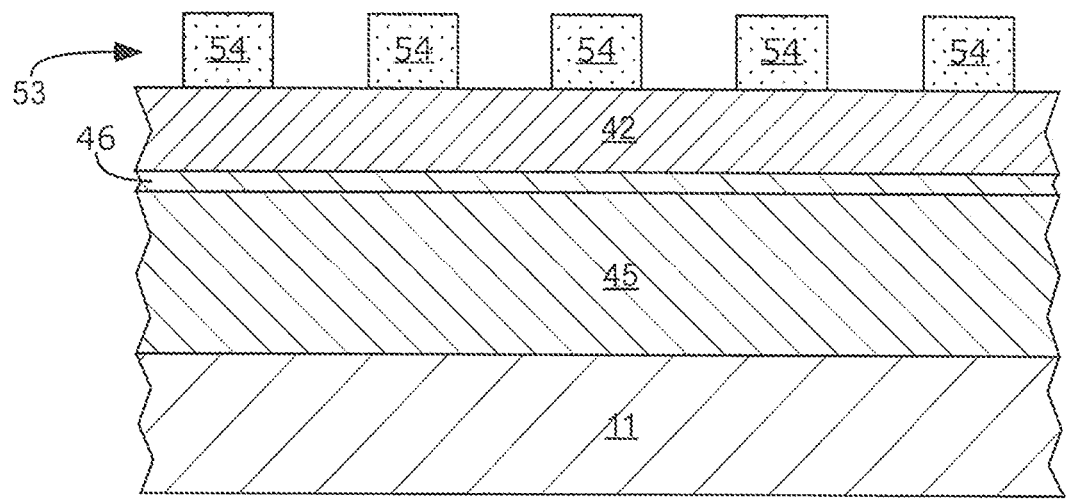

FIG. 5 is a cross-sectional side-view illustrating a step in a method of making a wire grid polarizer, including imprinting an array of upper ribs 54 and curing the uncured layer 43 to form a cured layer 53.

Figure 6:
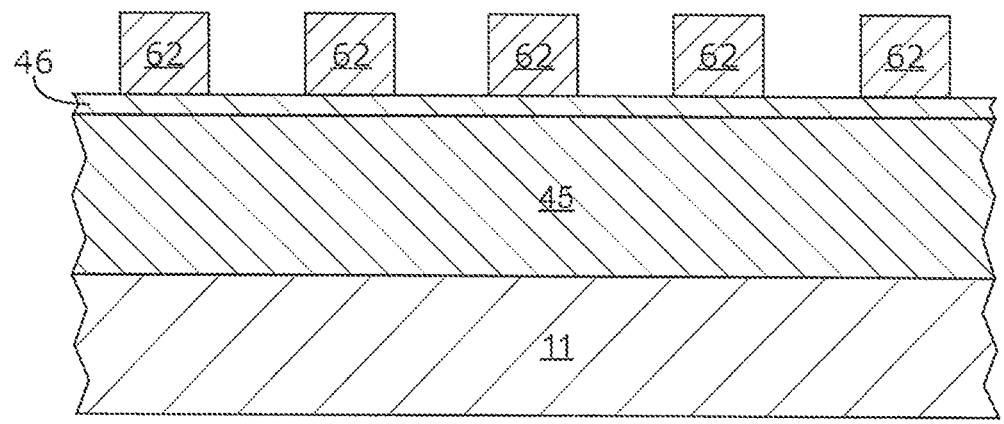

FIG. 6 is a cross-sectional side-view illustrating a step in a method of making a wire grid polarizer, including using the array of upper ribs 54 to etch an array of mask ribs 62 in the layer of silicon dioxide 42.

Figure 7:
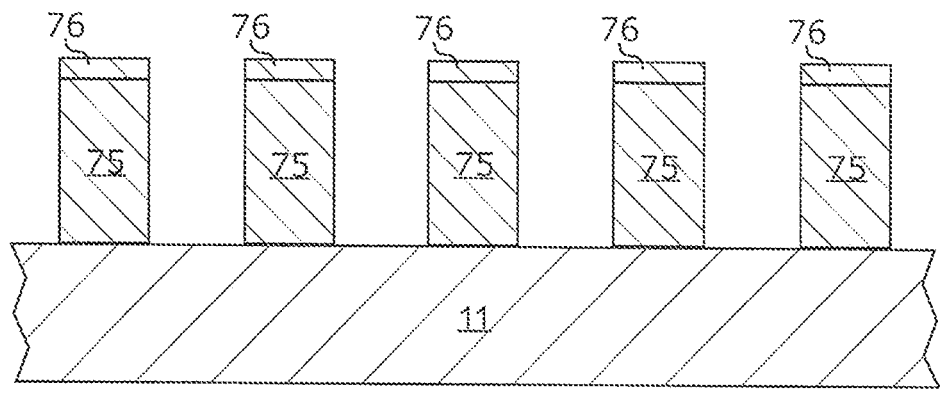

FIG. 7 is a cross-sectional side-view illustrating a step in a method of making a wire grid polarizer, including using the array of mask ribs 62 to etch the low-index layer 46 into an array of low-index ribs 76 and/or to etch the layer of silicon 45 into an array of silicon wires 75.

Figure 8:
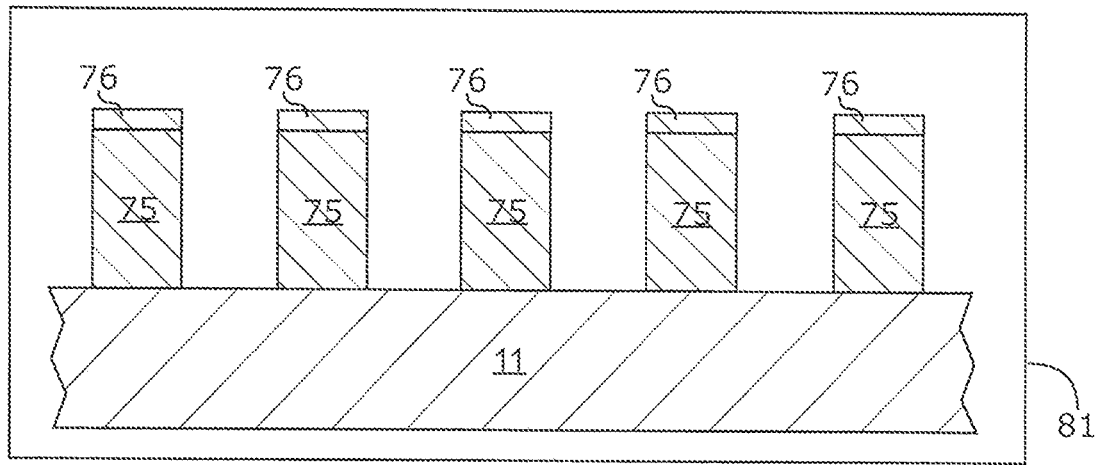

FIG. 8 is a cross-sectional side-view illustrating a step in a method of making a wire grid polarizer, including baking the array of silicon wires 75 in an oven 81.

DEFINITIONS

The following definitions, including plurals of the same, apply throughout this patent application.

As used herein, the term "elongated" means that wire length L is substantially greater than wire width W15 and wire thickness T15. For example, wire length L can be ≥5 times, ≥10 times, ≥100 times, ≥1000 times, or ≥10,000 times larger than wire width W15, wire thickness T15, or both. See FIG. 2.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "parallel" means exactly parallel; parallel within normal manufacturing tolerances; or almost exactly parallel, such that any deviation from exactly parallel would have negligible effect for ordinary use of the device.

As used herein, the term "pure silicon" means ≥99.9% pure; pure within normal manufacturing tolerances; or almost exactly pure, such that any deviation from exactly pure would have negligible effect for ordinary use of the device.

As used herein, the term "nm" means nanometer(s).

DETAILED DESCRIPTION

The wire grid polarizers 10 and 30 described herein, and wire grid polarizers made by methods described herein, can (a) have high performance across a broad range of the ultraviolet spectrum, (b) have high performance across a broad angle of incidence, and (c) be durable (resistant to heat, moisture, ultraviolet light, and oxidation).

As illustrated in FIGS. 1 and 3, wire grid polarizers 10 and 30 are shown comprising an array of wires 15 on a substrate 11. The substrate 11 can be a material with low absorptivity in the ultraviolet spectrum. The substrate 11 can be fused silica or other type of glass. The substrate 11 can comprise silicon dioxide, as discussed below.

The array of wires 15 can be parallel and elongated. A pitch P of the wires 15 can be less than ½ of a lowest wavelength of a desired range of polarization, such as the ultraviolet spectrum.

There can be a channel 16 between each pair of adjacent wires 15. The channels 16 can be filled with air or other gas, vacuum, liquid, solid, or combinations thereof. Any solid in the channels 16 can be transparent to the desired polarization, such as ultraviolet light.

Each wire 15 can have a core 12 that is mostly silicon and a pair of ribs 13 that are mostly silicon dioxide. The core 12 can be sandwiched between the pair of ribs 13.

The core 12 can have a proximal end 12p nearest the substrate 11, a distal end 12d farthest from the substrate 11, and a pair of sidewalls 12s extending between the proximal end 12p and the distal end 12d. Each sidewall call 12s face a channel 16.

Each rib 13 can be adjacent to, or adjoin, a sidewall 12s of the core 12. The pair of ribs 13 can extend from the proximal end 12p to the distal end 12d of the core 12.

As illustrated in FIG. 1, the wires 15 can further comprise a cap 14 at the distal end 12d of the core 12. The cap 14 can connect the pair of ribs 13. The cap 14 and the ribs 13 can have the same mass percent silicon dioxide.

Alternatively, the cap 14 can be made of another material, and can have a material composition different from the ribs 13. The cap 14 can have a low index of refraction for better wire grid polarizer performance. For example, the cap 14 can include a material with a refractive index n that is ≤1.5 or ≤1.6 across a wavelength range of 100 nm, 200 nm, or 300 nm in the ultraviolet or visible spectrums. The cap can comprise magnesium fluoride, hafnium oxide, silicon dioxide, germanium oxide, or combinations thereof. The cap can include ≥90 mass percent of any of these materials.

If the cap 14 comprises silicon dioxide, then the pair of ribs 13, the cap 14, and the substrate 11 can form a ring 17 around the core 12. The ring 17 can have ≥50 mass percent, ≥80 mass percent, ≥90 mass percent, ≥95 mass percent, ≥99 mass percent, or ≥99.9 mass percent silicon dioxide throughout the entire ring 17.

The core 12 can fill the ring 17. The core 12 can be the only thing inside of the ring 17. For this paragraph, any transition region with a chemical composition between that of the core 12 and the ring 17 is considered to be part of the core 12.

Illustrated in FIG. 3 are wires 15 without the cap 14. The pair of ribs 13 in each wire 15 can be separated from each other, and not connected by silicon dioxide at the distal end 12d of the core. The distal end 12d of the core 12 can adjoin the air.

The ribs 13 and the cap 14 can be formed at the same time during bake of the wire grid polarizer. Then, an added manufacturing step can remove the cap 14. Performance is similar for wire grid polarizers 10 and 30, so both designs are useful. Wire grid polarizer 10 is preferred, however, to avoid an added manufacturing step of cap 14 removal.

Each wire 15 can adjoin the substrate 11 or the air on all sides. Each wire 15 can comprise ≥90 mass percent, ≥95 mass percent, ≥99 mass percent, or ≥99.9 mass percent silicon and oxygen.

The core 12 can be mostly silicon. For example, the core 12 can have ≥80 mass percent, ≥90 mass percent, ≥95 mass percent, ≥99 mass percent, or ≥99.9 mass percent silicon. The core can also include other elements, such as germanium.

The wires 15 with a silicon core 12 can have high performance across a broad range of the ultraviolet spectrum. They can polarize across a broad angle of incidence. They can be durable (resistant to heat, moisture, and ultraviolet light).

The ribs 13, the cap 14, the substrate 11, or combinations thereof can comprise silicon dioxide. The ribs 13 can have ≥80 mass percent, ≥90 mass percent, ≥95 mass percent, ≥99 mass percent, or ≥99.9 mass percent silicon dioxide. The cap 14 can have ≥80 mass percent, ≥90 mass percent, ≥95 mass percent, ≥99 mass percent, or ≥99.9 mass percent silicon dioxide. The substrate 11 can have ≥80 mass percent, ≥90 mass percent, ≥95 mass percent, ≥99 mass percent, or ≥99.9 mass percent silicon dioxide. The substrate 11, the ribs 13, the cap 14, or combinations thereof can have 37 to 57 mass percent silicon and 63 to 43 mass percent oxygen (total mass percent silicon+oxygen+other chemical elements=100%).

The substrate 11 can have a different material composition than the ribs 13, than the cap 14, or both. This difference can result from the method of manufacture described below. This difference is preferred for performance of the wire grid polarizer. For example, a density of the ribs 13, the cap 14, or both can be less than a density of the substrate 11. As another example, the ribs 13, the cap 14, or both can have a higher mass percent silicon dioxide than the substrate 11.

The pair of ribs 13 and the cap 14 can adjoin each other. The pair of ribs 13 and the cap 14 can be integrally formed together. The pair of ribs 13 and the cap 14 can be a single, monolithic structure. The pair of ribs 13 and the cap 14 can have the same percent silicon dioxide, the same density, or both. Integrally forming the ribs 13 and the cap 14 together can improve wire grid polarizer performance due to identical material composition of the ribs 13 and the cap 14 and due to better connection between the ribs 13 and the cap 14.

Rib width W13, core width W12, rib aspect ratio AR13, core aspect ratio AR12, and cap thickness T14 can be selected for improved performance of the wire grid polarizer. Rib aspect ratio AR13 equals rib thickness T13 divided by rib width W13. Core aspect ratio AR12 equals core thickness T12 divided by core width W12.

Rib width W13 and core width W12 are measured perpendicular to an axis 18 (see FIGS. 1 & 3) of the core 12 extending from the proximal end 12p to the distal end 12d of the core 12 at a center of the core 12. Rib width W13 and core width W12 are measured half-way between the proximal end and the distal end. Rib thickness T13, core thickness T12, and cap thickness T14 are measured parallel to the axis 18 of the core 12.

For example, the rib width W13 can be ≥3 nm, ≥4 nm, ≥5 nm, or ≥7 nm. These rib widths W13 can be a minimum of all rib widths W13. As another example, the rib width W13 can be ≤7 nm, ≤10 nm, ≤12 nm, or ≤15 nm. These rib widths W13 can be a maximum of all rib widths W13. Rib width W13 can be controlled by bake time and temperature. An eight hour bake at 600° C. is preferred for better performance of the wire grid polarizer.

Example relationships between the rib width W13 and the core width W12 include the following: 0.2≤W12/W13, 1≤W12/W13, 2≤W12/W13. or 4≤W12/W13; and W12/W13≤4, W12/W13≤8, W12/W13≤12. Example core aspect ratios AR12 include the following: 4≤AR12, 10≤AR12, or 20≤AR12; and AR12≤30, AR12≤50, or AR12≤60. Example rib aspect ratios AR13 include the following: 8≤AR13, 10≤AR13, or 20≤AR13; and AR13≤30, AR13≤50, or AR13≤60. Example relationships between cap thickness T14 and rib width W13 include T14/W13≥1.5, T14/W13≥2, or T14/W13≥4.

A high core aspect ratio AR12 can improve wire grid polarizer performance, but also can result in weak wires 13. The pair of ribs 13 can strengthen a core 12 with a high core aspect ratio AR12.

Example pitches of the array of wires 15 include the following: P≥20 nm, P≥40 nm, or P≥55 nm; and P≤55 nm, P≤80 nm, P≤110 nm, or P≤150 nm.

Methods of making a wire grid polarizers can include some or all of the following steps. These steps can be performed in the following order or other order if so specified. Some of the steps can be performed simultaneously unless explicitly noted otherwise in the claims. Components of the wire grid polarizer can have properties as described above. Any additional description of properties of the wire grid polarizer in the method below, not described above, are applicable to the above described wire grid polarizers.

A first method of making a wire grid polarizer can comprise some or all of the following steps:
(a) applying a layer of silicon 45 on a substrate 11;
(b) applying a low-index layer 46 on the layer of silicon 45 (optional step);

(c) applying a layer of silicon dioxide 42 on the layer of silicon 45, or on the low-index layer 46 if used;

(d) applying an uncured layer 43 on the layer of silicon dioxide 42;

(e) imprinting an array of upper ribs 54 and curing the uncured layer 43 to form the uncured layer 43 into a solid, cured layer 53;

(f) using the array of upper ribs 54 to etch the layer of silicon dioxide 42 to form an array of mask ribs 62;

(g) using the array of mask ribs 62 to etch (i) the low-index layer 46 (if used) into an array of low-index ribs 76 and/or (ii) the layer of silicon 45 into an array of silicon wires 75; and (h) increasing a thickness of oxide on an outer surface of the silicon wires 75, forming each silicon wire 75 into a core 12 sandwiched between a pair of ribs 13, and a cap 14 at a distal end 12d of the core 12 farthest from the substrate 11.

Steps (a) through (d) are illustrated in FIG. 4. Step (e) is illustrated in FIG. 5. Step (f) is illustrated in FIG. 6. Step (g) is illustrated in FIG. 7. Step (h) is illustrated in FIG. 8, with oven 81, and in FIGS. 1 and 3.

The layer of silicon 45 can be pure silicon. The layer of silicon 45 in step (a) can be applied by sputter deposition or evaporation deposition. Sputter deposition is preferred. Use of a target with ≥99.999 atomic percent silicon is preferred. Wire grid performance can be improved due to the purity and density of the silicon core 12 resulting from sputter deposition. The layer of silicon 45 can adjoin the substrate 11.

Step (b), applying the low-index layer 46, and step (g)(i), etching the low-index layer 46 into an array of low-index ribs 76, are optional in this first method. If these steps (b) and (g)(i) are performed, the low-index rib 76 can be the cap 14. The low-index layer 46 and the low-index ribs 76 can have a material composition as described above for the cap 14.

The low-index layer 46 in step (b) and the layer of silicon dioxide 42 in step (c) can be applied by sputter deposition. The layer of silicon dioxide 42 can adjoin the low-index layer 46 or the layer of silicon 45.

The uncured layer 43 in step (d) can be a liquid with solid inorganic nanoparticles, such as for example silicon dioxide nanoparticles, dispersed throughout a continuous phase.

Curing in step (e) can include evaporation of the continuous phase. The inorganic nanoparticles can include silicon dioxide bonded to organic moieties. Examples of the organic moieties include —SH, -ROH (R=alkyl), —CH$_3$, and —CH$_2$CH$_3$. Integrity of the cured layer 53 can be improved by curing at a relatively low temperature, such as for example around 125° C.

Curing and imprinting the array of upper ribs 54 in step (d) can be simultaneous or sequential. Normally, the imprinting will be done first, or partly at the same time as curing.

If the low-index layer 46 is not used, then the layer of silicon 45 can be the only solid layer between the array of mask ribs 62 and the substrate 11. If the low-index layer 46 is used, then the layer of silicon 45 and the low-index layer 46 can be the only solid layer between the array of mask ribs 62 and the substrate 11.

For step (h), the core 12 can have ≥90 mass percent silicon, and the ribs 13 and the cap 14 can have ≥90 mass percent silicon dioxide.

In step (h), increasing the thickness of the oxide on the outer surface of the silicon wires can include one or more of the following procedures performed on the silicon wires: rapid thermal annealing, electromagnetic heating (e.g. microwave), oxygen plasma, water plasma, baking, anodic oxidation, or combinations thereof. Any of these methods can be performed in air or oxygen. Other possible methods for increasing the thickness of the oxide on the outer surface of the silicon wires include chemical oxidation, exposure to ultraviolet light and ozone, or both.

In step (h), if baking is used to increase the thickness of the oxide, example temperatures include ≥400° C., ≥500° C., or ≥550° C.; and ≤650° C., ≤700° C., or ≤800° C. Bake time can include ≥3 hours, ≥5 hours, or ≥7 hours; and ≤9 hours, ≤12 hours, or ≤15 hours.

Making the wires 15 out of silicon, then baking to form the ribs 13 of silicon dioxide, can result in a higher core aspect ratio AR12. This higher core aspect ratio AR12 can improve performance of the wire grid polarizer.

A second method of making a wire grid polarizer can comprise some or all of the following steps:

(a) applying a layer of silicon 45 on a substrate 11;

(b) patterning and etching the layer of silicon 45 to form an array of silicon wires 75; and (c) increasing a thickness of oxide on an outer surface of the silicon wires 75, forming each silicon wire 75 into a core 12 sandwiched between a pair of ribs 13, and a cap 14 at a distal end 12d of the core 12 farthest from the substrate 11.

Steps (a) and (b) are illustrated in FIGS. 4-7. Patterning and etching can be done by laser interference lithography. Layers 46, 42, and 43 are optional. Step (c) is illustrated in FIG. 8, with oven 81, and in FIGS. 1 & 3. Steps (b) and (g)(i) of the first method can be added to this second method. Additional description above for the first method can also apply to this second method. Description of step (a) in the first method can apply to step (a) in the second method. Description of step (h) in the first method can apply to step (c) in the second method.

What is claimed is:

1. A wire grid polarizer comprising:

an array of wires on a substrate with a channel between each pair of adjacent wires;

each wire including a core and a pair of ribs, the core including ≥90 mass percent silicon each rib including ≥90 mass percent silicon dioxide;

the core including a proximal end nearest the substrate, a distal end farthest from the substrate, and a pair of sidewalls extending between the proximal end and the distal end, each sidewall facing a channel;

the core sandwiched between the pair of ribs, each rib adjacent to a sidewall of the core;

a rib width is ≥4 nm, the rib width measured perpendicular to an axis of the core extending from the proximal end to the distal end of the core at a center of the core; and wherein the substrate comprises silicon dioxide and the pair of ribs have a higher mass percent silicon dioxide than the substrate.

2. A wire grid polarizer comprising:

an array of wires on a substrate with a channel between each pair of adjacent wires;

each wire including a core and a pair of ribs, the core including ≥90 mass percent silicon, each rib including ≥90 mass percent silicon dioxide;

the core including a proximal end nearest the substrate, a distal end farthest from the substrate, and a pair of sidewalls extending between the proximal end and the distal end, each sidewall facing a channel;

the core sandwiched between the pair of ribs, each rib adjacent to a sidewall of the core;

a rib width is ≥4 nm, the rib width measured perpendicular to an axis of the core extending from the proximal end to the distal end of the core at a center of the core; and wherein 4≤AR12≤60, where AR12 is a core aspect ratio, defined as a core thickness divided by a core width, the core width measured perpendicular to the axis of the core, and 8≤AR13≤60, where AR13 is a rib aspect ratio, defined as a rib thickness divided by the rib width, the core thickness and the rib thickness measured parallel to the axis of the core, both widths measured half-way between the proximal end and the distal end.

3. A wire grid polarizer comprising:
an array of wires on a substrate with a channel between each pair of adjacent wires;
each wire including a core and a pair of ribs, the core including ≥90 mass percent silicon, each rib including ≥90 mass percent silicon dioxide;
the core including a proximal end nearest the substrate, a distal end farthest from the substrate, and a pair of sidewalls extending between the proximal end and the distal end, each sidewall facing a channel;
the core sandwiched between the pair of ribs, each rib adjacent to a sidewall of the core;
a rib width is ≥4 nm, the rib width measured perpendicular to an axis of the core extending from the proximal end to the distal end of the core at a center of the core;
a cap at the distal end of the core, the cap connecting the pair of ribs, the cap including ≥90 mass percent silicon dioxide; and
wherein T14/W13≥2, where T14 is a thickness of the cap, measured parallel to the axis of the core, and W13 is a width of the rib measured half-way between the proximal end and the distal end.

4. A wire grid polarizer comprising:
an array of wires on a substrate with a channel between each pair of adjacent wires;
each wire including a core and a pair of ribs, the core including >90 mass percent silicon, each rib including ≥90 mass percent silicon dioxide;
the core including a proximal end nearest the substrate, a distal end farthest from the substrate, and a pair of sidewalls extending between the proximal end and the distal end, each sidewall facing a channel;
the core sandwiched between the pair of ribs, each rib adjacent to a sidewall of the core;
a rib width is ≥4 nm, the rib width measured perpendicular to an axis of the core extending from the proximal end to the distal end of the core at a center of the core; and
wherein each wire adjoins the substrate or the air on all sides, and each wire comprises ≥90 mass percent silicon and oxygen.

5. A wire grid polarizer comprising:
an array of wires on a substrate with a channel between each pair of adjacent wires;
each wire including a core and a pair of ribs, the core including ≥90 mass percent silicon, each rib including ≥90 mass percent silicon dioxide;
the core including a proximal end nearest the substrate, a distal end farthest from the substrate, and a pair of sidewalls extending between the proximal end and the distal end, each sidewall facing a channel;
the core sandwiched between the pair of ribs, each rib adjacent to a sidewall of the core;
a rib width is ≥4 nm, the rib width measured perpendicular to an axis of the core extending from the proximal end to the distal end of the core at a center of the core; and
the substrate comprises silicon dioxide and a density of the pair of ribs is less than a density of the substrate.

6. The wire grid polarizer of claim 5, wherein the pair of ribs extend from the proximal end to the distal end of the core.

7. The wire grid polarizer of claim 5, wherein a minimum rib width is ≥5 nm.

8. The wire grid polarizer of claim 5, wherein a maximum rib width is ≤12 nm.

9. The wire grid polarizer of claim 5, wherein 0.2≤W12/W13≤8, where W12 is a core width, measured perpendicular to the axis of the core, and W13 is the rib width, both widths measured half-way between the proximal end and the distal end.

10. The wire grid polarizer of claim 5, further comprising a cap at the distal end of the core, the cap connecting the pair of ribs, the cap including ≥90 mass percent silicon dioxide.

11. The wire grid polarizer of claim 10, wherein the substrate comprises silicon dioxide and a density of the cap is less than a density of the substrate.

12. The wire grid polarizer of claim 10, wherein the cap and the ribs have the same mass percent silicon dioxide.

13. The wire grid polarizer of claim 10, wherein the pair of ribs, the cap, and the substrate form a ring of silicon dioxide around the core.

14. The wire grid polarizer of claim 13, wherein the core fills the ring.

15. A wire grid polarizer comprising:
an array of wires on a substrate with a channel between each pair of adjacent wires;
each wire including a core, a pair of ribs, and a cap, the core including ≥90 mass percent silicon, each rib and the cap including ≥90 mass percent silicon dioxide;
the core including a proximal end nearest the substrate, a distal end farthest from the substrate, and a pair of sidewalls extending between the proximal end and the distal end, each sidewall facing one of the channels;
the core sandwiched between the pair of ribs, each rib adjacent to a sidewall of the core;
the cap located at the distal end of the core, connecting the pair of ribs; and
a density of the pair of ribs and the cap is less than a density of the substrate.

16. The wire grid polarizer of claim 15, wherein:
the pair of ribs and the cap have a higher mass percent silicon dioxide than the substrate; and
the pair of ribs and the cap have the same mass percent silicon dioxide.

17. The wire grid polarizer of claim 15, wherein the pair of ribs and the cap have the same density.

18. The wire grid polarizer of claim 15, wherein the cap has a higher mass percent silicon dioxide than the substrate.

19. The wire grid polarizer of claim 15, wherein the pair of ribs, the cap, and the substrate form a ring of silicon dioxide around the core, and the core fills the ring.

20. The wire grid polarizer of claim 15, wherein T14/W13≥2, where T14 is a thickness of the cap, measured parallel to the axis of the core, and W13 is a width of the rib measured half-way between the proximal end and the distal end.

* * * * *